US012617484B2

(12) United States Patent
Amano et al.

(10) Patent No.: US 12,617,484 B2
(45) Date of Patent: May 5, 2026

(54) STRADDLE VEHICLE

(71) Applicants: KAWASAKI MOTORS, LTD., Akashi (JP); ROBERT BOSCH GmbH, Stuttgart (DE)

(72) Inventors: Hiroaki Amano, Akashi (JP); Tomoaki Saio, Yokohama (JP); Gen Okuzuka, Yokohama (JP)

(73) Assignees: KAWASAKI MOTORS, LTD., Akashi (JP); ROBERT BOSCH GmbH, Stuttgart (DE)

( * ) Notice: Subject to any disclaimer, the term of this patent is extended or adjusted under 35 U.S.C. 154(b) by 703 days.

(21) Appl. No.: 18/054,037

(22) Filed: Nov. 9, 2022

(65) Prior Publication Data

US 2023/0141000 A1 May 11, 2023

(30) Foreign Application Priority Data

Nov. 10, 2021 (JP) .................................. 2021-183299

(51) Int. Cl.
| | |
|---|---|
| *B62J 6/01* | (2020.01) |
| *B60Q 1/44* | (2006.01) |
| *B60T 8/17* | (2006.01) |
| *B60W 30/16* | (2020.01) |
| *B62J 6/045* | (2020.01) |

(52) U.S. Cl.
CPC ..................................... *B62J 6/01* (2020.02); *B60Q 1/44* (2013.01); *B60T 8/1706* (2013.01); *B60W 30/162* (2013.01); *B62J 6/045* (2020.02); *B60T 2270/406* (2013.01)

(58) Field of Classification Search
CPC .. B62J 6/01; B62J 6/045; B62J 6/015; B60W 30/162; B60Q 1/44; B60T 8/1706; B60T 2270/406
See application file for complete search history.

(56) References Cited

U.S. PATENT DOCUMENTS

| | | | |
|---|---|---|---|
| 2011/0063100 A1* | 3/2011 | Jinksy | ..................... B60Q 1/44 340/467 |
| 2021/0394855 A1 | 12/2021 | Pfau | |

FOREIGN PATENT DOCUMENTS

| | | |
|---|---|---|
| JP | 2015067253 | 4/2015 |
| JP | 2020-091671 | 6/2020 |

* cited by examiner

*Primary Examiner* — John A Tweel, Jr.
(74) *Attorney, Agent, or Firm* — Fay Kaplun & Marcin, LLP

(57) ABSTRACT

A motorcycle includes a brake lamp, a brake operation unit, a first switching unit, a second switching unit, and a brake controller. The first switching unit switches a circuit state so that a driving current is supplied to the brake lamp while the brake operation is being performed. The second switching unit switches the circuit state between a closed state in which the driving current is supplied to the brake lamp regardless of the brake operation and an opened state in which the second switching unit is not electrically connected with the brake lamp. The brake controller controls to actuate the brake and switches the second switching unit from the opened state to the closed state when the brake activation condition is met.

9 Claims, 6 Drawing Sheets

STRADDLE VEHICLE

CROSS-REFERENCE TO RELATED APPLICATIONS

The present application claims priority from JP Patent Application Serial No. 2021-183299 filed on Nov. 10, 2021; the entire content of which is incorporated herein by reference.

FIELD

The present disclosure relates to a straddle vehicle having a brake lamp.

BACKGROUND

The patent literature 1 (JP Patent Application Laid-Open No. 2020-91671) discloses a straddle vehicle having a brake lamp and a speed controller. A speed controller adjusts the speed of the straddle-type vehicle in response to adaptive cruise control. The speed controller reduces speed of the straddle vehicle by actuating the brakes. The straddle vehicle has a warning device that warns when the warning device recognizes a possibility of colliding with a following vehicle. A brake lamp is disclosed as one example of the warning devices.

SUMMARY

The patent literature 1 discloses that the brake lamp is automatically turned on when a possibility of colliding with a following vehicle is recognized. However, the patent literature 1 does not disclose that the brake lamp is automatically turned on when a possibility of collision with the following vehicle cannot be recognized. Therefore, for example, when the speed controller decreases a speed of the straddle vehicle in a situation where the following vehicle is far from the straddle vehicle, the brake lamp does not turn on. In other words, there is a possibility that turning on or not of the brake lamp is different between when a driver actuates the brake and when the speed controller actuates the brake. In particular, downsizing, low cost, or the like are strongly demanded in a straddle vehicle, it is desirable to achieve above functions with a simple circuit configuration.

The present disclosure relates to a straddle vehicle that turns on a brake lamp when a brake is automatically actuated as when a brake is manually actuated.

According to the aspect of the present disclosure, a straddle vehicle having the following configuration is provided. That is, the straddle vehicle includes a brake lamp, a brake operation unit, a first switching unit, a second switching unit, and a brake controller. The brake lamp turns on by supply of a driving current. The brake operation unit receives a brake operation. The first switching unit switches a circuit state so that the driving current is supplied to the brake lamp while the brake operation is being performed.

The second switching unit switches a circuit state between a closed state in which the driving current is supplied to the brake lamp regardless of the brake operation and an opened state in which the second switching unit is not electrically connected with the brake lamp. The brake controller that controls to actuates a brake and switches the second switching unit from the opened state to the closed state when a brake activation condition is met.

According to the present application, a straddle vehicle that turns on a brake lamp when a brake is automatically actuated as when a brake is manually actuated is provided.

DETAILED DESCRIPTION

Hereinafter, in this embodiment, a motorcycle 1, which is an example of a straddle vehicle, will be described with reference to the drawings.

Figure 1:
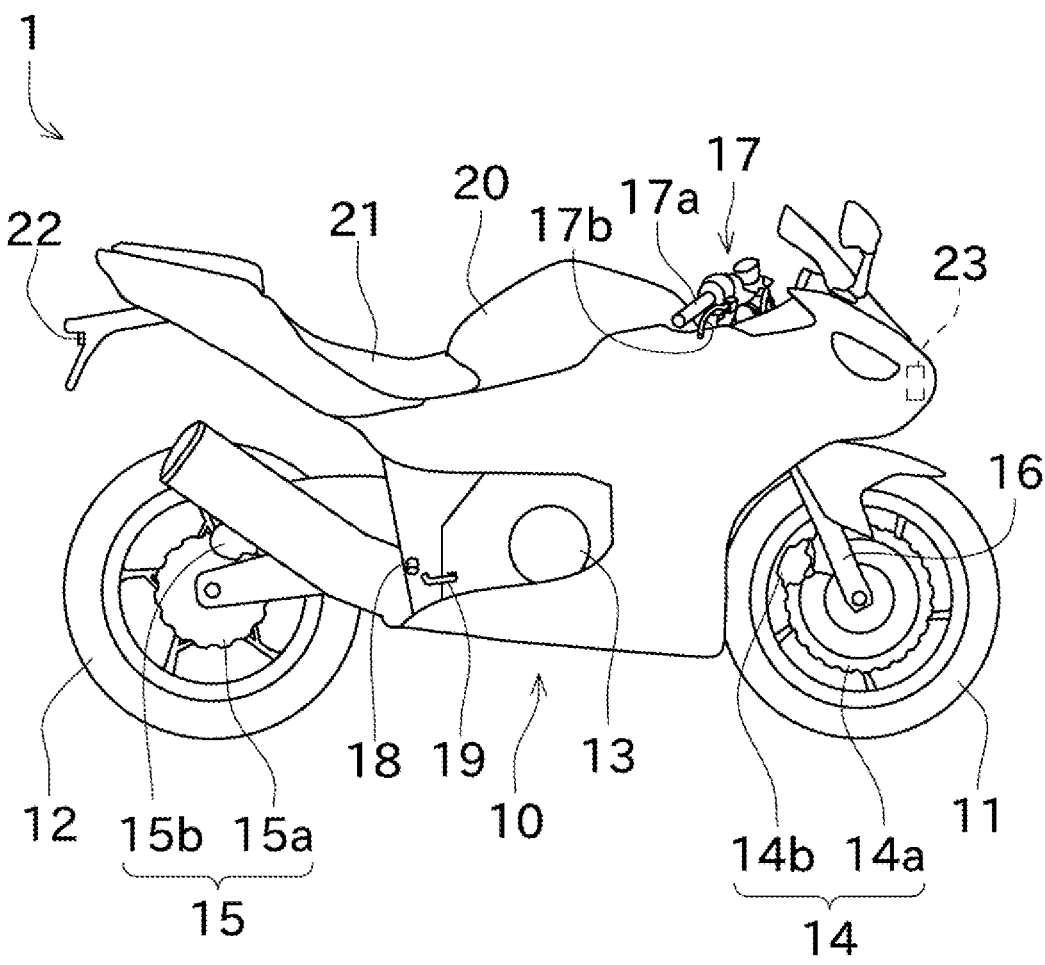
FIG. 1 is a side view of a motorcycle according to this embodiment.

In descriptions below, the left-right direction of the motorcycle 1 is defined based on the view from a rider riding on the motorcycle 1. Therefore, the front-rear direction coincides with a vehicle length direction, and the left-right direction coincides with a vehicle width direction. The vertical direction and the up-down direction coincide with a height direction. As shown in FIG. 1, the motorcycle 1 includes a vehicle body 10, a front wheel 11, and a rear wheel 12.

The vehicle body 10 includes a plurality of the vehicle body frames serving as a framework of the motorcycle 1. Various components constituting the motorcycle 1 are attached to these body frames. An engine 13 is provided in vicinity of a center in the vehicle length direction of the vehicle body 10. The engine 13 is a drive source for driving the motorcycle 1. The engine 13 of this embodiment is a gasoline engine. Instead of or in addition to the gasoline engine, another driving source, for example, an electric motor for traveling may be provided. Power generated by the engine 13 is transmitted to the rear wheel 12 via a drive chain. This makes it possible to drive the motorcycle 1. The drive source may be omitted and power may be generated by pedaling of the rider.

The front wheel 11 is rotatably attached to the vehicle body 10 via an axle. A front brake device 14 is attached to the front wheel 11. The front brake device 14 includes a front brake disc 14a and a front brake caliper 14b. The front brake disc 14a rotates integrally with the front wheel 11. The front brake caliper 14b is attached not to the front wheel 11 side but to the vehicle body 10 side, so that even if the front brake disc 14a rotates, the front brake caliper 14b does not rotate. The front brake caliper 14b can switch between a state in which the brake pad is pressed against the front brake disc 14a and a state in which the brake pad is separated from the front brake disc 14a. A braking force is generated by pressing the brake pad against the front brake disc 14a.

The rear wheel 12 is rotatably attached to the vehicle body 10 via an axle. A rear brake device 15 is attached to the rear wheel 12. The rear brake device 15 includes a rear brake disc 15a and a rear brake caliper 15b. The rear brake disc 15a rotates integrally with the rear wheel 12. The rear brake caliper 15b is attached not to the rear wheel 12 side but to the vehicle body 10 side, so that even if the rear brake disc 15a rotates, the rear brake caliper 15b does not rotate. The rear brake caliper 15b can switch between a state in which the brake pad is pressed against the rear brake disc 15a and a state in which the brake pad is separated from the rear brake disc 15a. A braking force is generated by pressing the brake pad against the rear brake disc 15a.

A front fork 16 is attached to the vehicle body frame. A pair of left and right front forks 16 are provided so as to sandwich the front wheel 11 in a front view. A handle unit 17 is provided near the upper end of the front fork 16. The handle unit 17 includes a steering handle 17a, a brake lever 17b, and various switches.

The steering handle 17a is a bar handle type and an operating tool that is gripped by the rider for steering. When the rider rotates the steering handle 17a about a steering shaft, the front fork 16 and the front wheel 11 rotate. This makes it possible to turn to change a travel direction of the motorcycle 1. The motorcycle 1 is a lean vehicle in which the vehicle body 10 is tilted toward the turning center with respect to a road surface when turning.

The brake lever 17b is an operation tool for actuating the front brake device 14. The brake lever 17b is a brake operation unit. The rider performs a brake operation by gripping the brake lever 17b. The rider performs the brake operation to the brake lever 17b, and therefore a brake fluid is supplied to the front brake caliper 14b via a brake hose. A braking force is generated by pressing the brake pad against the front brake disc 14a.

A fuel tank 20 is provided behind the handle unit 17 and above the engine 13. The fuel tank 20 stores fuel to be supplied to the engine 13. A seat 21 on which the rider sits is provided behind the fuel tank 20. Steps 18 are provided on the left side and the right side of the vehicle body 10, respectively. The rider straddles the seat 21 and places his/her feet on the left and right steps 18. In this way, the rider sits across the seat 21, so the motorcycle 1 is a straddle vehicle.

A brake pedal 19 is arranged in front of the step 18 on the right side. The brake pedal 19 is a brake operation unit. The rider performs a brake operation by treading the brake pedal 19 with the foot. The rider performs the brake operation to the brake pedal 19, and therefore a brake fluid is supplied to the rear brake caliper 15b via a brake hose. A braking force is generated by pressing the brake pad against the rear brake disc 15a.

The brake configuration described above is an example and may differ from this embodiment. For example, the braking device is not limited to disc brakes and may be drum brakes. The brake caliper may be actuated by wires instead of the brake fluid. The brake pedal 19 may be omitted and both the front and rear brakes may be actuated by the brake lever 17b.

A brake lamp 22 is arranged at the rear part of the motorcycle 1. When the rider or a brake controller 32, which will be described later, actuate the brake, the brake lamps 22 are turned on. The light source of the brake lamp 22 may be a light bulb using a filament or may be an LED.

A radar device 23 is an example of a forward detection device which is arranged at the front end or near thereof of the motorcycle 1. The radar device 23 detects distance to one or more objects in front and speed of the objects by transmitting detection waves forward and acquiring reflected waves reflected by the objects. The detection waves transmitted by the radar device 23 are electromagnetic waves, specifically infrared rays, millimeter waves, or microwaves. The motorcycle 1 notifies the rider of information about the detected objects and controls the speed of the motorcycle 1 based on the detection result of the radar device 23.

Next, a vehicle speed control of the motorcycle 1 will be described with reference to FIG. 2.

Figure 2:
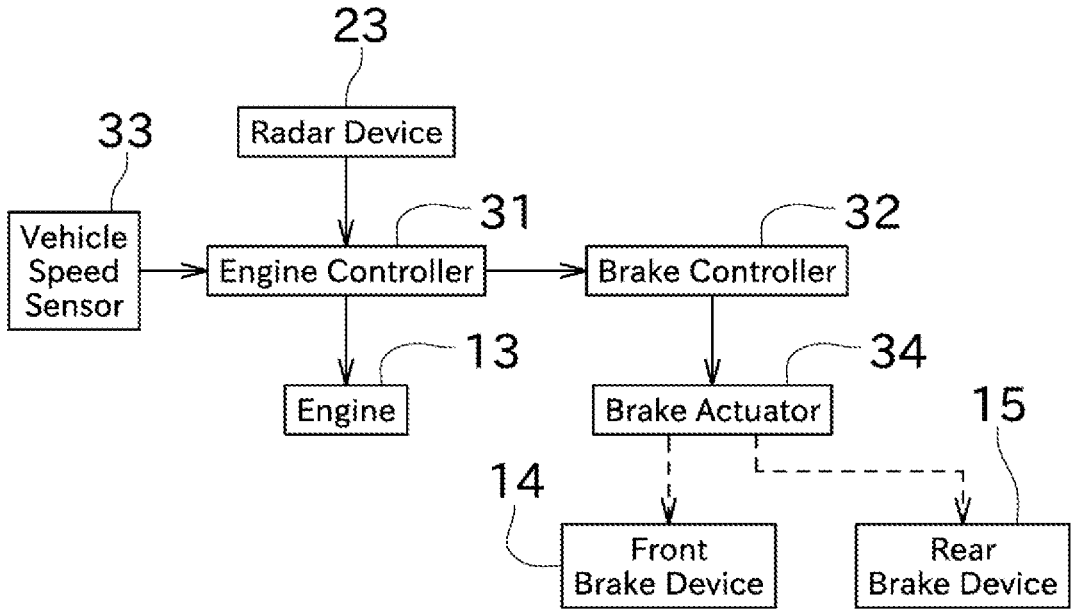
FIG. 2 is a block diagram for performing a vehicle speed control.

As shown in FIG. 2, the motorcycle 1 includes an engine controller 31, a brake controller, and various sensors. Each device can transmit and receive data by CAN communication, for example. Instead of the CAN communication, data may be transmitted and received by connecting each device with an individual signal line. The sensors are the radar device 23 and the vehicle speed sensor 33, for example. The vehicle speed sensor 33 is a sensor that detects the vehicle speed based on the number of rotations of the front wheel 11, for example.

The engine controller 31 includes an arithmetic unit such as a CPU, and a storage device such as a RAM and a storage. The engine controller 31 performs various controls related to the engine 13 by executing a program stored in the storage device by the arithmetic unit. Specifically, the engine controller 31 controls ignition timing, valve opening/closing timing, fuel injection amount, or the like. For example, the engine controller 31 can accelerate the motorcycle 1 by increasing the fuel injection amount.

The brake controller 32 includes an arithmetic unit such as a CPU, and a storage device such as a RAM and a storage. The brake controller 32 performs various controls related to the brake by executing a program stored in the storage device by the arithmetic unit. Specifically, the brake controller 32 controls the brake actuator 34 to actuate the brake when the brake controller 32 determines that a brake activation condition is met. The brake actuator 34 is a pump in this embodiment and is a device for feeding brake fluid to at least one of the front brake device 14 and the rear brake device 15. The brake actuator 34 may be a device that generates a mechanical pressing force.

The brake activation condition is a condition for actuating the brake by the brake controller 32. For example, when a command to reduce the vehicle speed is received from the engine controller 31, the brake activation condition is met. The brake activation condition may include a condition that a distance from a preceding vehicle is equal to or less than a threshold.

The motorcycle 1 can perform adaptive cruise control (ACC control). The adaptive cruise control is control in which the distance from the preceding vehicle keeps constant by accelerating or decelerating the motorcycle 1 within a predetermined vehicle speed range. Specifically, the radar device 23 calculates the acceleration for maintaining the distance between the motorcycle 1 and the preceding object based on the distance to the preceding object and the speed of the preceding object. In the following explanation, a wording "acceleration" includes not only acceleration, but also deceleration. The radar device 23 requests the calculated acceleration from the brake controller 32. The brake controller 32 calculates braking force and engine torque for achieving the acceleration requested by the radar device 23. The brake controller 32 calculates torque engine brake torque instead of the engine torque when the motorcycle 1 is decelerating. The brake controller 32 controls pressure of the brake fluid by using the pump described above so that the calculated brake force is generated. Further, the brake controller 32 requests the calculated engine torque or engine brake torque from the engine controller 31. The engine controller 31 controls the engine 13 so that the engine torque or the engine brake torque requested by the brake controller 32 is archived. The adaptive cruise control is performed as described above.

The brake controller 32 can also perform ABS control. ABS stands for Anti-lock Braking System. The ABS control is control that prevents locking of the front wheel 11 and the rear wheel 12 when the brake is actuated. The brake controller 32 estimates slip conditions of the front wheel 11 and the rear wheel 12 based on information input from wheel sensors or the like. The brake controller 32 actuates the brake actuator 34 depending on the slip conditions of the front wheel 11 and the rear wheel 12 to pressurize or depressurize the brake fluid, thereby preventing the front wheel 11 and the rear wheel 12 from locking and to brake the motorcycle 1.

The brake controller 32 can also perform ESS. ESS stands for Emergency Stop Signal. Specifically, when the rider actuates heavy brake, the brake controller 32 turns on the brake lamp 22 to notify the following vehicle of the matter.

Figure 3:
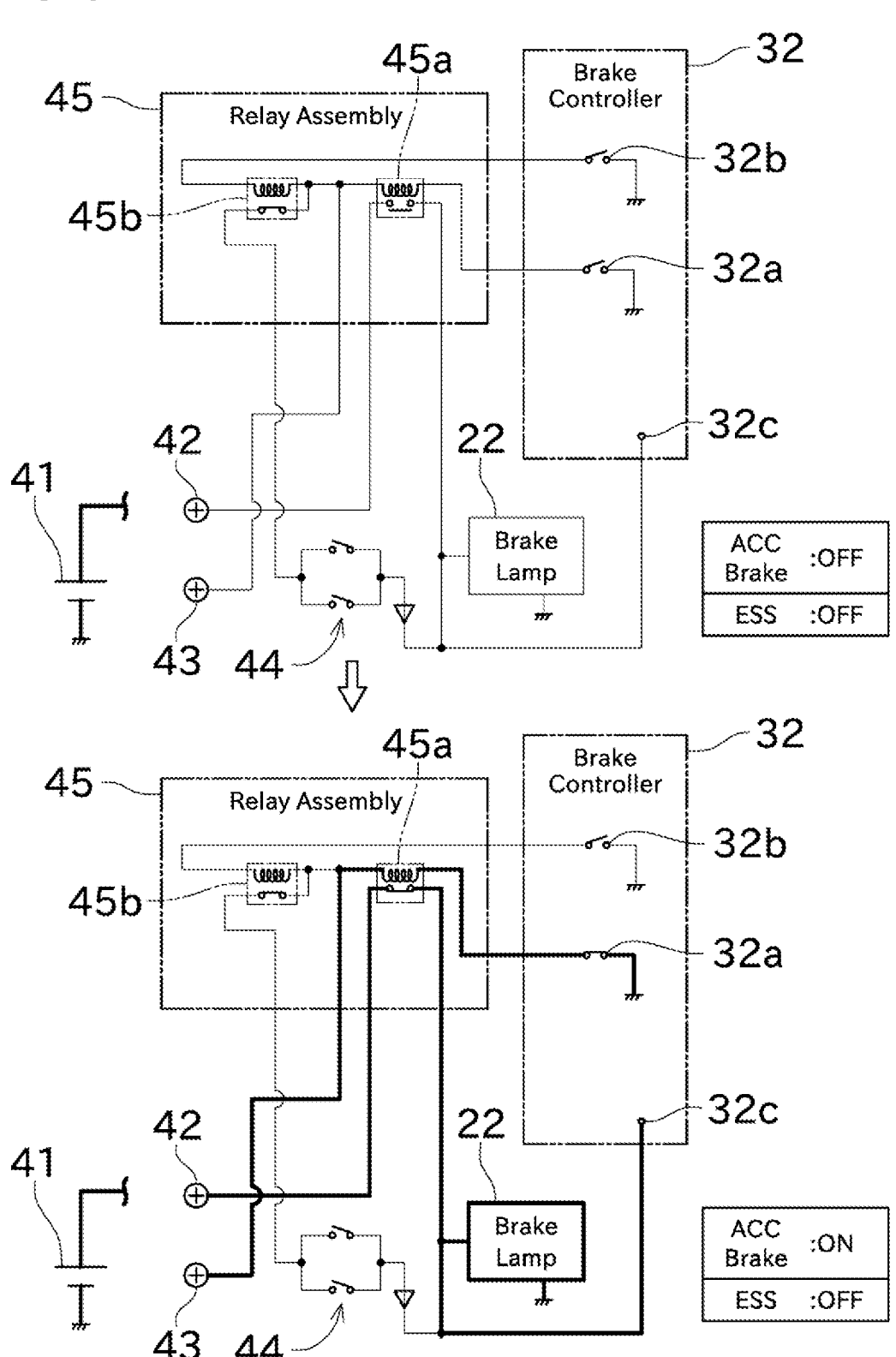
FIG. 3 is a circuit diagram showing a switch from a circuit state in which a brake lamp is off due to no brake operation to a circuit state in which the brake lamp is on by ACC brake.
Figure 4:
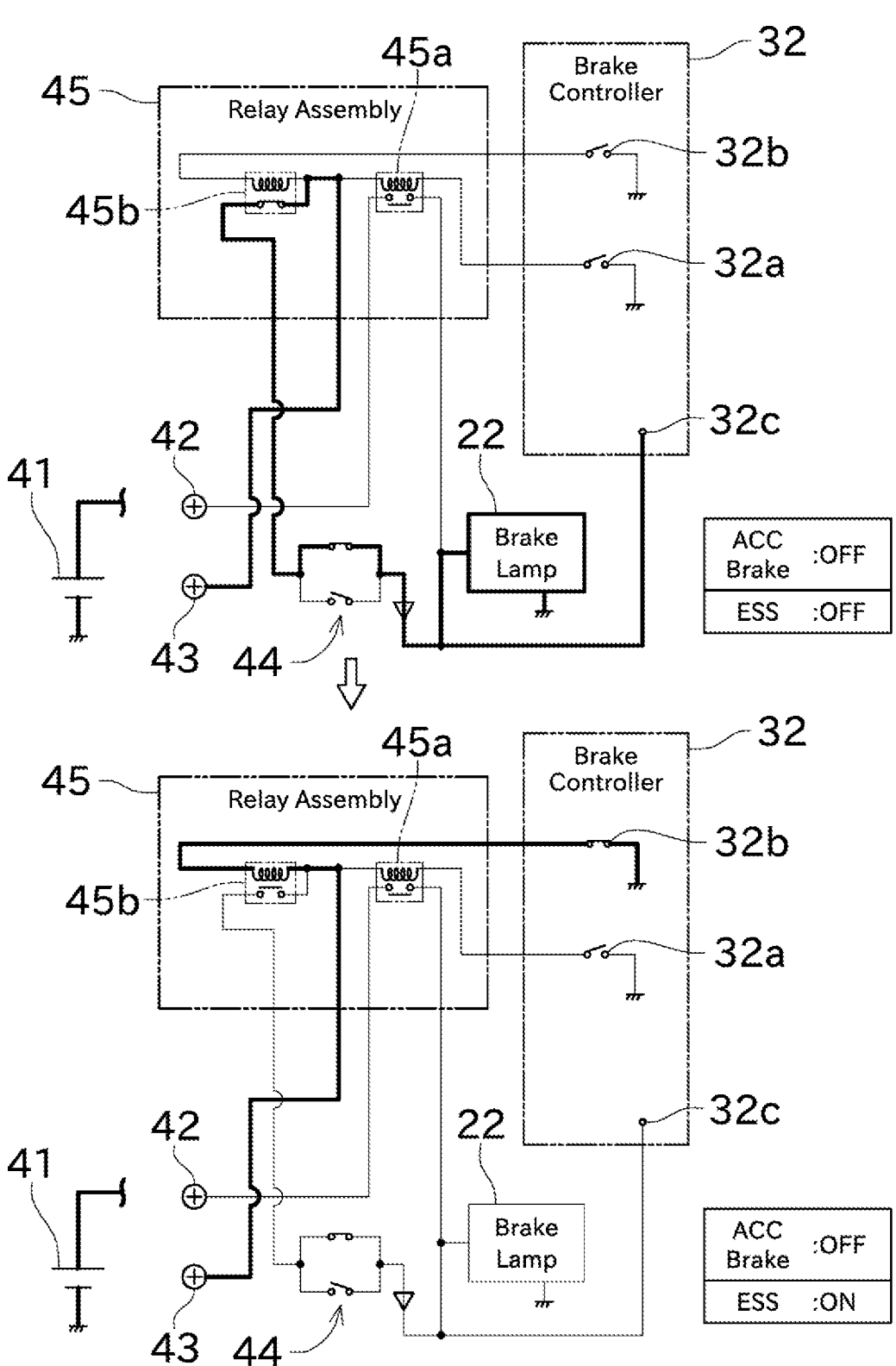
FIG. 4 is a circuit diagram showing a switch from a circuit state in which a brake lamp is on due to a brake operation to a circuit state in which the brake lamp is off by ESS.
Figure 5:
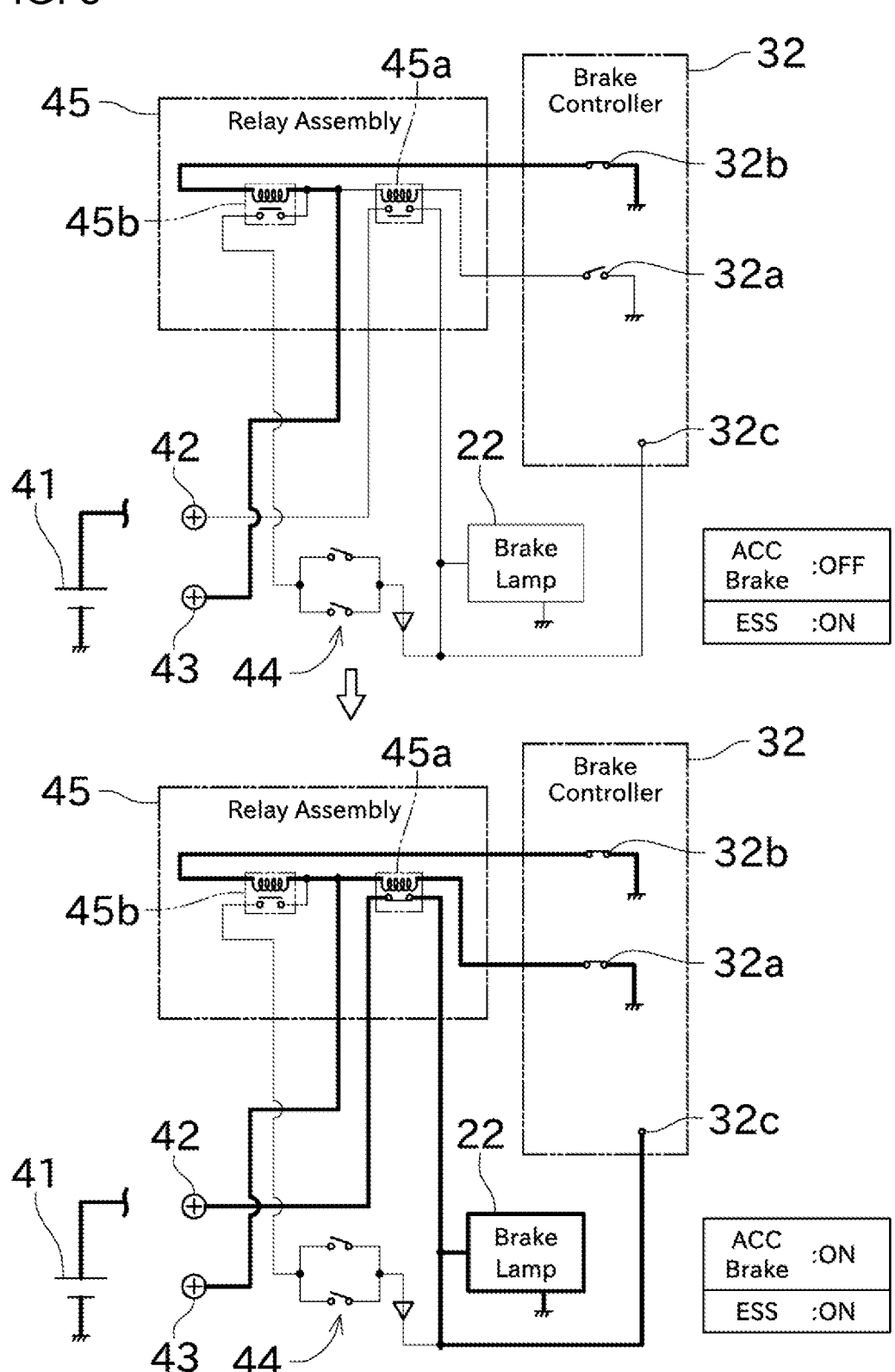
FIG. 5 is a circuit diagram showing a switch from a circuit state in which a brake lamp is off to a circuit state in which the brake lamp is on by ACC brake.
Figure 6:
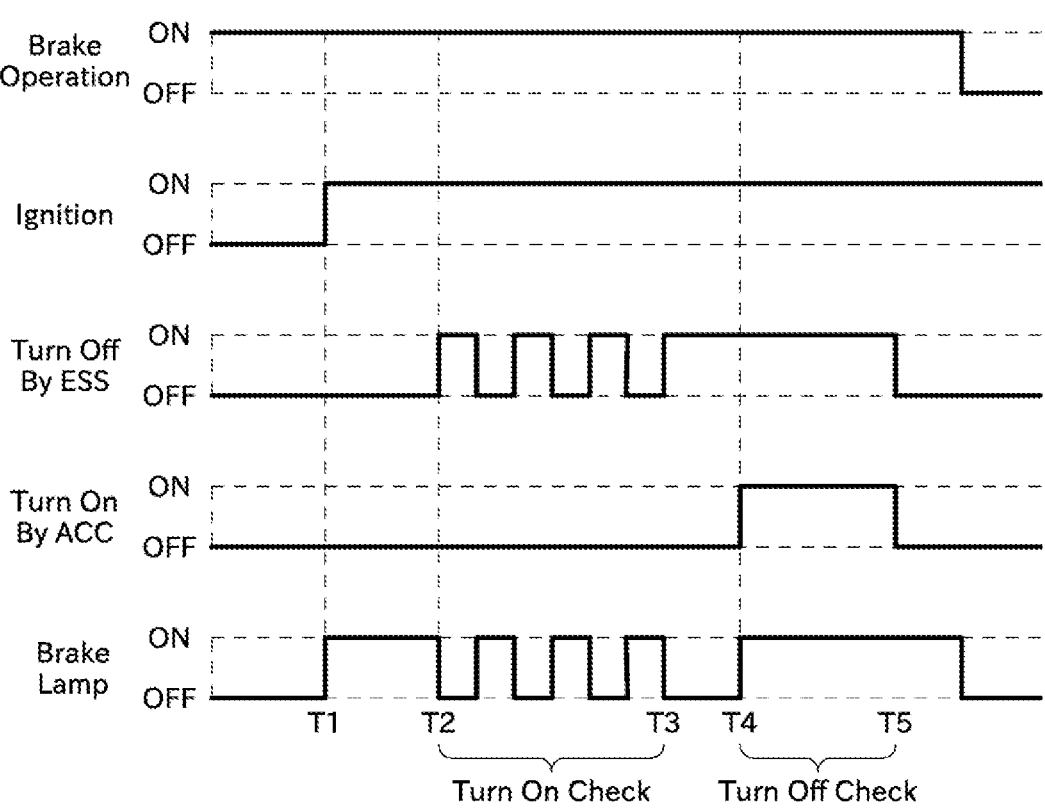
FIG. 6 is a timing chart of a turning off check process and a turning on check process.

Next, a circuit configuration for turning on and off the brake lamp 22 will be described with reference to from FIG. 3 to FIG. 5. In FIG. 3 to FIG. 5, thick lines indicate current flowing portions. ACC brake is a brake actuated in the adaptive cruise control.

As shown in FIG. 3, a battery 41, a first input unit 42, a second input unit 43, a first switching unit 44, and a relay assembly 45 are provided. The relay assembly 45 includes a second switching unit 45a and a third switching unit 45b. The second switching unit 45a and the third switching unit 45b are relays that switch the opened/closed state of the circuit according to the current signal.

The battery 41 stores electric power generated using the power of the engine 13 of the motorcycle 1. The electrical components of the motorcycle 1 are electrically connected to the battery 41 and actuated by the electric power of the battery 41. The battery 41 is electrically connected to the first input unit 42 and the second input unit 43.

A circuit for supplying driving current to the brake lamps 22 is connected to each of the first input unit 42 and the second input unit 43. The driving current is a current for turning on the brake lamp 22. By electrically connecting the battery 41 and the brake lamp 22, the driving current is supplied from the battery 41 to the brake lamp 22 to turn on the brake lamp 22.

A circuit connected to the first input unit 42 is connected to the brake lamp 22 through the second switching unit 45a. Therefore, when the second switching unit 45a is in the closed state, the driving current is supplied to the brake lamp 22 and the brake lamp 22 is turned on. When the second switching unit 45a is in the opened state, the second switching unit 45a and the brake lamp 22 are not electrically connected and the driving current is not supplied to the brake lamp 22 via the second switching unit 45a.

The opened/closed state of the second switching unit 45a is controlled by the brake controller 32. The brake controller 32 includes a first switch 32a. The brake controller 32 can switch the opened/closed state of the first switch 32a. The first switch 32a is connected to the second input unit 43 via a coil of the second switching unit 45a. Therefore, the brake controller 32 can switch the opened/closed states of the second switching unit 45a by switching the opened/closed states of the first switch 32a.

FIG. 3 shows that the second switching unit 45a is switched from the opened state to the closed state and the driving current is supplied to the brake lamp 22 by switching the first switch 32a from the opened state to the closed state by the brake controller 32. In other words, the brake lamp 22 can be turned on by the control of the brake controller 32 regardless of the brake operation to the brake operation unit.

When the brake controller 32 determines that the brake activation condition is met, the brake controller 32 actuates the brake by the brake actuator 34 and switches the first switch 32a to the closed state to turn on the brake lamp 22. Since the second switching unit 45a is a relay, it is possible to switch between supply and non-supply of the driving current without performing control system communication. The second switching unit 45a is not limited to a relay, and may be a switching element that receives a signal of the control system and switches between opened/closed states.

A condition for switching the first switch 32a to the closed state may be added. For example, in addition to meet the brake activation condition, a condition in which deceleration exceeds a first threshold may be added. As a result, the brake lamp 22 is not turned on when the deceleration is low, and the brake lamp 22 is turned on when the deceleration is high.

A circuit connected to the second input unit 43 is connected to the brake lamp 22 through the third switching unit 45b and the first switching unit 44. Therefore, when the third switching unit 45b and the first switching unit 44 are closed state, the driving current is supplied to the brake lamp 22 and the brake lamp 22 is turned on. When at least one of the third switching unit 45b and the first switching unit 44 is in the opened state, the driving current is not supplied to the brake lamp 22 via the first input unit 42. Since a circuit from the first input unit 42 to the brake lamp 22 and a circuit from the second input unit 43 to the brake lamp 22 are independent, the driving current can be supplied via either one of them and the brake lamp 22 is turned on.

The opened/closed states of the third switching unit 45b is controlled by the brake controller 32, like the second switching unit 45a. The brake controller 32 includes a second switch 32b. The brake controller 32 can switch the opened/closed state of the second switch 32b. The second switch 32b is connected to the second input unit 43 via a coil of the third switching unit 45b. Therefore, the brake controller 32 can switch the opened/closed states of the third switching unit 45b by switching the opened/closed states of the second switch 32b.

The first switching unit 44 is switched between the opened/closed state depending on whether or not the brake operation is performed to the brake operation unit. Specifically, the first switching unit 44 includes two switches arranged in parallel. Each switch actuates in conjunction with the brake lever 17b and the brake pedal 19. That is, one switch of the first switching unit 44 is closed state while the brake operation is performed to the brake lever 17b. The other switch of the first switching unit 44 is closed state while the brake operation is performed to the brake pedal 19. In other words, the first switching unit 44 is closed state while the brake operation is performed to at least one of the brake operation units.

Therefore, the brake lamp 22 is turned on by the brake operation to the brake operation units while the brake controller 32 controls the third switching unit 45b to be the closed state. While the brake controller 32 controls the third switching unit 45b to be the opened state, the brake lamp 22 is turned off regardless of the operation of the brake operation units.

FIG. 4 shows that the third switching unit 45b is switched from the closed state to the opened state and the supply of the driving current to the brake lamp 22 is stopped by switching the second switch 32b from the opened state to the closed state by the brake controller 32. In other words, the brake lamp 22 can be turned off by the control of the brake controller 32 even while the brake operation is being performed to the brake operation units.

When the brake controller 32 determines that the turning off condition is met, the brake controller 32 turns off the brake lamp 22 by switching the third switching unit 45b to the open state. In this embodiment, the turning off condition about the ESS described above is set. In other words, the brake controller 32 blinks the brake lamp 22 by continuously switching the state of the third switching unit 45b when the brake controller 32 determines that the rider actuates heavy brake. That is, the turning off condition is that the deceleration of the motorcycle 1 exceeds the second threshold. The second threshold is a value greater than the first threshold described above. Other turning off condition may be set.

The brake controller 32 includes a detection switch 32c. The detection switch 32c is electrically connected between the second switching unit 45a and the brake lamp 22, and electrically connected between the first switching unit 44 and the brake lamp 22. Therefore, in a situation where the driving current is supplied to the brake lamp 22, the current is also supplied to the detection switch 32c. The brake controller 32 can detect whether or not the driving current is supplied to the brake lamp 22 based on the current detection result by the detection switch 32c.

As described above, the brake lamp 22 is turned on by supplying the driving current via the first input unit 42 or the second input unit 43. Therefore, as shown in FIG. 5, even if the brake controller 32 makes the third switching unit 45b be the opened state, the brake lamp 22 is turned on by switching the second switching unit 45a to the closed state by the brake controller 32. In other words, in this embodiment, when the process of turning on the brake lamp 22 and the process of turning off the brake lamp 22 are performed at the same time, the brake lamp 22 is turned on.

Next, a method for checking a turning off function of the brake lamp 22 by the ESS and a turning on function of the brake lamp 22 by the ACC of the brake controller 32 will be described. In the following description, processes of checking turning off function will be referred to as turning off check process, and processes of checking the turning on function will be referred to as turning on check process.

The turning off check process and the turning on check process are automatically performed when electrical system is started. The starting time of the electrical system is timing when electric power is supplied to the electrical components of the motorcycle 1. The motorcycle 1 of this embodiment performs a turning off check process and the turning on check process at the timing when the power-off state is switched to the ignition-on state. When an ignition power supply and an accessory power supply are separated, the turning off check process and the turning on check process may be performed at the timing when being switched to the accessory-on state.

It is supposed that the rider checks results of the turning off check process and the turning on check process. Therefore, an example in which the rider checks will be described below. However, a person other than the rider, for example, a maintenance worker may check it.

The rider switches to the ignition-on state while performing the brake operation (time T1). Since the rider is performing the brake operation, the brake lamp 22 is turned on by switching to the ignition-on state.

Next, the brake controller 32 repeats the process of turning off the brake lamp 22 by switching the third switching unit 45b to the opened state (from time T2 to time T3). As a result, the brake lamp 22 blinks. The rider can confirm that the turning off function is normal by confirming that the brake lamp 22 is turned off. Furthermore, the rider can also confirm that a blinking function is normal by confirming that the brake lamp 22 blinks.

The motorcycle 1 may determine that the turning off function and the blinking function are normal instead of the rider. The brake controller 32 can detect whether or not the brake lamp 22 is turned on or off because the brake controller 32 includes the detection switch 32c. when the brake controller 32 detects that the brake lamp 22 is switched between a turning on and a turning off from time T2 to time T3, the brake controller 32 determines that the turning off function and the blinking function are normal.

Next, the brake controller 32 switches the second switching unit 45a from the opened state to the closed state to turn on the brake lamp 22 in a situation where the third switching unit 45b is kept opened state to turn off the brake lamp 22 (time T4). As described above, the brake lamp 22 is turned on when both the process of turning off the brake lamp 22 and the process of turning on the brake lamp 22 are performed by the brake controller 32. The rider can confirm that the turning on function is normal by confirming that the brake lamp 22 blinks, is turned off, and is turned on.

The motorcycle 1 may determine that the turning on function is normal instead of the rider. When the brake controller 32 detects that the brake lamp 22 is switched from off to on at time T4, the brake controller 32 determines that the turning on function is normal.

Next, the brake controller 32 switched the second switching unit 45a back to the opened state and the third switching unit 45b back to the closed state. Thus, in this embodiment, the turning off check process and the turning on check process can be performed in a series of processes.

In this embodiment, the turning on check process is performed in a situation where the brake controller 32 turns off the brake lamp 22. Therefore, even if the rider is performing the brake operation, the turning on check process can be performed without any problem since the brake lamp 22 is turned off.

The turning off check process and the turning on check process may be performed separately. The motorcycle 1 perform only one of the turning off check process and the turning on check process. The motorcycle 1 may perform the turning off check process or the turning on check process in response to an indication of the rider instead of the timing of the ignition-on. Alternatively, the turning off check process and the turning on check process may be performed only when the ignition is switched to on while the rider is performing the brake operation.

As described above, the motorcycle 1 of this embodiment includes the brake lamp 22, the brake operation unit, the first switching unit 44, the second switching unit 45a, and the brake controller 32. The brake lever 17b and the brake pedal 19 correspond to the brake operation unit. The brake lamp 22 turns on by supplying the driving current. The brake operation unit receives the brake operation. The first switching unit 44 is switched the circuit state so that the driving current is supplied to the brake lamp 22 while the brake operation is being performed. The second switching unit 45a is switched the circuit state between the closed state in which the driving current is supplied to the brake lamp 22 regardless of the brake operation and the opened state in which the second switching unit 45a is not electrically connected with the brake lamp 22. The brake controller 32 controls to actuate the brake and switches the second switching unit 45a from the opened state to the closed state when the brake activation condition is met.

Accordingly, when the brake controller 32 actuates the brake, the brake lamp 22 can be turned on in the same manner as when the rider performs the brake operation. The circuit configuration can be simplified because two electrical systems for turning on the brake lamp 22 can be achieved simply by switching the circuit state.

The second switching unit 45a of the motorcycle 1 of this embodiment is a relay. The brake controller 32 switches the circuit state of the second switching unit 45a by supplying the current to the second switching unit 45a.

Accordingly, the second switching unit 45a can be switched without performing the control system communication.

The motorcycle 1 of this embodiment performs the adaptive cruise control that is a control for automatically adjusting the distance between the motorcycle 1 and the preceding vehicle. The brake activation condition that is determined by the brake controller 32 includes the condition in which the distance between the motorcycle 1 and the preceding vehicle is equal to or less than the threshold in the adaptive cruise control.

Accordingly, the brake lamp 22 can be turned on during actuating the brake by adaptive cruise control.

In the motorcycle 1 of this embodiment, the brake controller 32 performs the turning on check process in which the brake controller 32 switches the second switching unit 45a from the opened state to the closed state in order to check whether the function of turning on the brake lamp 22 by the brake controller 32 is normal or not.

Accordingly, turning on the brake lamp 22 by the brake controller 32 can be checked.

In the motorcycle 1 of this embodiment, the brake controller 32 automatically performs the turning on check process when the electrical system is started.

This allows for easily checking the function of turning on because the user needs not to instruct the turning on check process.

The motorcycle 1 of this embodiment includes the third switching unit 45b. The third switching unit 45b is switched the circuit state between the closed state in which the driving current is supplied to the brake lamp 22 by the brake operation and the opened state in which the driving current is not supplied to the brake lamp 22 even if the brake operation is performed. When the brake controller 32 determines that the turning off condition is met, the brake controller 32 turns off the brake lamp 22 by switching the third switching unit 45b from the closed state to the opened state.

Accordingly, the brake lamp 22 can be turned off by the process of the brake controller 32 even while performing the brake operation.

In the motorcycle 1 of this embodiment, the brake controller 32 performs the turning off check process in which the brake controller 32 switches the third switching unit 45b from the closed state to the opened state in order to check whether the function of turning off the brake lamp 22 by the brake controller 32 is normal or not.

Accordingly, turning off the brake lamp 22 by the brake controller 32 can be checked.

The motorcycle 1 of this embodiment includes the third switching unit 45b. The brake controller 32 performs the turning off check process and the turning on check process.

Accordingly, both of the process of turning on the brake lamp 22 by the brake controller 32 and the process of turning off the brake lamp 22 by the brake controller 32 can be checked In the motorcycle 1 of this embodiment, after the brake controller 32 switches the third switching unit 45b to the opened state during the brake operation is performed, and the brake controller 32 switches the second switching unit 45a from the opened state to the closed state while maintaining the opened state of the third switching unit 45b.

As a result, both of the process of turning on the brake lamp 22 and the process of turning off the brake lamp 22 can be checked that these processes are normal if it is confirmed that the brake lamp 22 is switched in the order of turning on, turning off, and turning on. In other words, two functions can be checked simply by performing a series of processes.

Although a preferred embodiment of the present invention has been described above, the configuration above can be modified, for example, as follows.

The circuit diagram shown in the drawings is an example and may be a different circuit configuration. For example, the function of turning off the brake lamp 22 may be omitted by omitting the third switching unit 45b.

Although the second switching unit 45a and the third switching unit 45b are provided in one relay assembly 45 in the above embodiment, they may be provided separately.

In the above embodiment, the radar device 23 is used as an example of a forward detection device, but a sonar device or a camera may be used.

In the above embodiment, the motorcycle 1 was described as an example of the straddle vehicle, but straddle vehicles other than the motorcycle 1, such as a straddle vehicle having two front wheels and one rear wheel or a straddle vehicle having one front wheel and two rear wheels can be applied the configuration of this embodiment.

What is claimed is:

1. A straddle vehicle, comprising:
a brake lamp configured to be turned on by supply of a driving current;
a brake operation unit configured to receive a brake operation;
a first switching unit configured to switch a circuit state so that the driving current is supplied to the brake lamp while the brake operation is performed;
a second switching unit configured to switch a circuit state between a closed state in which the driving current is supplied to the brake lamp regardless of the brake operation and an opened state in which the second switching unit is not electrically connected with the brake lamp;
a brake controller configured to control a brake actuation and switching of the second switching unit from the opened state to the closed state when a condition of the brake activation is met;
a first circuit connecting from the first switching unit to the brake lamp; and
a second circuit connecting from the second switching unit to the brake lamp, the first and second circuits being independent,
wherein the brake controller performs a turning on check process in which the brake controller switches the second switching unit from the opened state to the closed state in order to check whether a function of turning on the brake lamp by the brake controller is normal or not.

2. The straddle vehicle according to claim 1, wherein the second switching unit is a relay, and wherein the brake controller switches the circuit state of the second switching unit by supplying a current to the second switching unit.

3. The straddle vehicle according to claim 1, wherein the straddle vehicle performs an adaptive cruise control that is a control for automatically adjusting a distance between the straddle vehicle and a preceding vehicle and wherein the condition of the brake activation includes a condition in which the distance between the straddle vehicle and the preceding vehicle in the adaptive cruise control is equal to or less than a threshold.

4. The straddle vehicle according to claim 1, wherein the brake controller automatically performs the turning on check process when an electrical system is started.

5. The straddle vehicle according to claim 1, further comprising:

a third switching unit configured to switch a circuit state between a closed state in which the driving current is supplied to the brake lamp by the brake operation and an opened state in which the driving current is not supplied to the brake lamp even if the brake operation is performed, wherein the brake controller turns off the brake lamp by switching the third switching unit from the closed state to the opened state when the brake controller determines a turning off condition is met.

6. The straddle vehicle according to claim 1, further comprising:

a third switching unit configured to switch a circuit state between a closed state in which the driving current is supplied to the brake lamp by the brake operation and an opened state in which the driving current is not supplied to the brake lamp even if the brake operation is performed, wherein the brake controller performs a turning on check process in which the brake controller switches the second switching unit from the opened state to the closed state in order to check whether a function of turning on the brake lamp by the brake controller is normal or not, and wherein the brake controller performs a turning off check process in which the brake controller switches the third switching unit from the closed state to the opened state in order to check whether a function of turning off the brake lamp by the brake controller is normal or not.

7. The straddle vehicle according to claim 6, wherein after the brake controller performs the turning off check process by switching the third switching unit to the opened state during the brake operation is performed, the brake controller performs the turning on check process by switching the second switching unit from the opened state to the closed state while maintaining the opened state of the third switching unit.

8. A straddle vehicle, comprising:

a brake lamp configured to be turned on by supply of a driving current;

a brake operation unit configured to receive a brake operation;

a first switching unit configured to switch a circuit state so that the driving current is supplied to the brake lamp while the brake operation is performed;

a second switching unit configured to switch a circuit state between a closed state in which the driving current is supplied to the brake lamp regardless of the brake operation and an opened state in which the second switching unit is not electrically connected with the brake lamp;

a brake controller configured to control a brake actuation and switching of the second switching unit from the opened state to the closed state when a condition of the brake activation is met;

a first circuit connecting from the first switching unit to the brake lamp;

a second circuit connecting from the second switching unit to the brake lamp, the first and second circuits being independent; and a third switching unit configured to switch a circuit state between a closed state in which the driving current is supplied to the brake lamp by the brake operation and an opened state in which the driving current is not supplied to the brake lamp even if the brake operation is performed, wherein the brake controller turns off the brake lamp by switching the third switching unit from the closed state to the opened state when the brake controller determines a turning off condition is met, and wherein the brake controller performs a turning off check process in which the brake controller switches the third switching unit from the closed state to the opened state in order to check whether a function of turning off the brake lamp by the brake controller is normal or not.

9. A straddle vehicle, comprising:

a brake lamp configured to be turned on by supply of a driving current;

a brake operation unit configured to receive a brake operation;

a first switching unit configured to switch a circuit state so that the driving current is supplied to the brake lamp while the brake operation is performed;

a second switching unit configured to switch a circuit state between a closed state in which the driving current is supplied to the brake lamp regardless of the brake operation and an opened state in which the second switching unit is not electrically connected with the brake lamp; and a brake controller configured to control a brake actuation and switching of the second switching unit from the opened state to the closed state when a condition of the brake activation is met, wherein the brake controller performs a turning on check process in which the brake controller switches the second switching unit from the opened state to the closed state in order to check whether a function of turning on the brake lamp by the brake controller is normal or not, and wherein the brake controller automatically performs the turning on check process when an electrical system is started.

* * * * *